United States Patent
Kaneko et al.

(10) Patent No.: US 10,742,980 B2
(45) Date of Patent: Aug. 11, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yushi Kaneko, Kawasaki (JP); Masashi Kawakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/406,197

(22) Filed: May 8, 2019

(65) Prior Publication Data

US 2019/0356919 A1 Nov. 21, 2019

(30) Foreign Application Priority Data

May 15, 2018 (JP) ................................ 2018-093980

(51) Int. Cl.
*H04N 19/105* (2014.01)
*H04N 19/124* (2014.01)
*H04N 19/176* (2014.01)
*H04N 19/136* (2014.01)

(52) U.S. Cl.
CPC ......... *H04N 19/124* (2014.11); *H04N 19/105* (2014.11); *H04N 19/136* (2014.11); *H04N 19/176* (2014.11)

(58) Field of Classification Search
CPC .. H04N 19/124; H04N 19/136; H04N 19/105; H04N 19/176; H04N 19/115; H04N 19/149
See application file for complete search history.

(56) References Cited

U.S. PATENT DOCUMENTS

| | | |
|---|---|---|
| 5,333,013 A | 7/1994 | Enari et al. |
| 5,452,007 A | 9/1995 | Enari et al. |
| 5,528,298 A | 6/1996 | Enari et al. |
| 8,340,445 B2 | 12/2012 | Yamaguchi et al. |
| 9,473,684 B2 | 10/2016 | Kaneko |
| 9,609,192 B2 | 3/2017 | Kaneko |
| 9,635,370 B2 | 4/2017 | Ueki et al. |
| 2010/0220936 A1 | 9/2010 | Yamaguchi et al. |
| 2015/0256839 A1 | 9/2015 | Ueki et al. |
| 2016/0267683 A1* | 9/2016 | Nakanishi ............ H04N 19/176 |

FOREIGN PATENT DOCUMENTS

| | | |
|---|---|---|
| JP | 2010-004514 A | 1/2010 |
| JP | 2015-170994 A | 9/2015 |

* cited by examiner

*Primary Examiner* — Joseph W Becker
(74) *Attorney, Agent, or Firm* — Venable LLP

(57) ABSTRACT

An image processing apparatus which calculates a code amount obtained upon coding a coding block being obtained by dividing an image to be processed, determines an assigned code amount to be assigned to each of the coding blocks, based on a reference code amount and the code amount calculated for each of coding blocks in a coding group including a plurality of coding blocks, and generates coded data by coding each of the coding blocks using the assigned code amount as a target code amount, wherein the assigned code amount is determined so that a total of the assigned code amounts of the coding blocks in the coding group is the same among a plurality of coding groups, and fixed-length coding is carried out on a coding group-by-coding group basis by coding using the determined assigned code amounts.

10 Claims, 12 Drawing Sheets

FIG. 1A
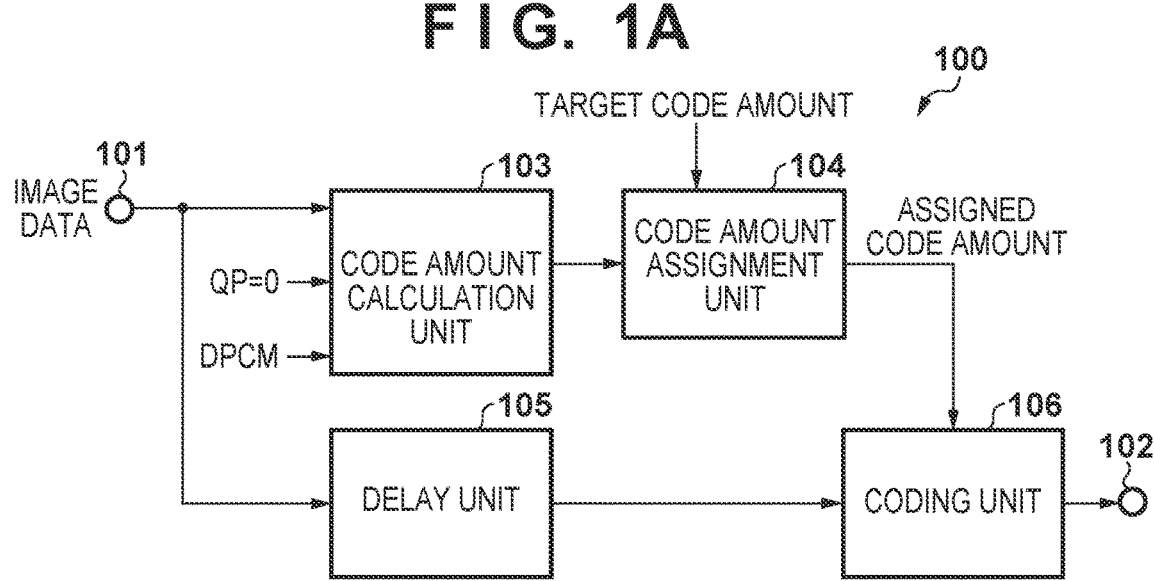
FIG. 1B
| PIXEL NUMBER | 0 | 1 | 2 | 3 | 4 | 5 | 6 | 7 | 8 | ....... | 60 | 61 | 62 | 63 |
|---|---|---|---|---|---|---|---|---|---|---|---|---|---|---|
| IMAGE DATA | Cb0 | Y0 | Cr0 | Y1 | Cb1 | Y2 | Cr1 | Y3 | Cb2 | ....... | Cb15 | Y30 | Cr15 | Y31 |
FIG. 1C
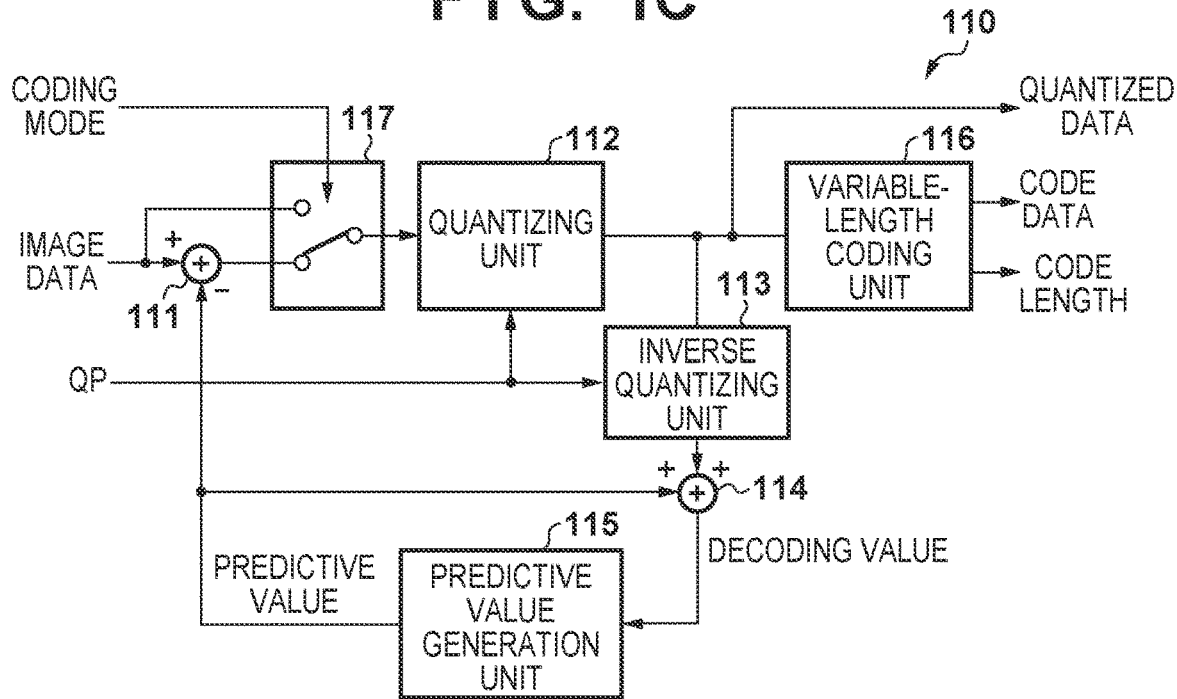

FIG. 6A
| qp | HEADER CODE AMOUNT bl_size_h | LUMA SIGNAL CODE AMOUNT bl_size_y[qp] | CHROMA SIGNAL CODE AMOUNT sl_size_c[qp] | TOTAL |
|---|---|---|---|---|
| 0 | 5 | 415 | 135 | 555 |
| 1 | 5 | 395 | 97 | 497 |
| 2 | 5 | 381 | 96 | 482 |
| 3 | 5 | 369 | 87 | 461 |
| 4 | 5 | 358 | 81 | 444 |
| 5 | 5 | 333 | 63 | 401 |
| 6 | 5 | 325 | 62 | 392 |
| 7 | 5 | 312 | 61 | 378 |
| 8 | 5 | 302 | 55 | 362 |
| 9 | 5 | 290 | 49 | 344 |
| 10 | 5 | 276 | 46 | 327 |
| 11 | 5 | 258 | 45 | 308 |
| 12 | 5 | 247 | 44 | 296 |
| 13 | 5 | 235 | 41 | 281 |
| 14 | 5 | 214 | 38 | 257 |
| 15 | 5 | 207 | 35 | 247 |
FIG. 6B
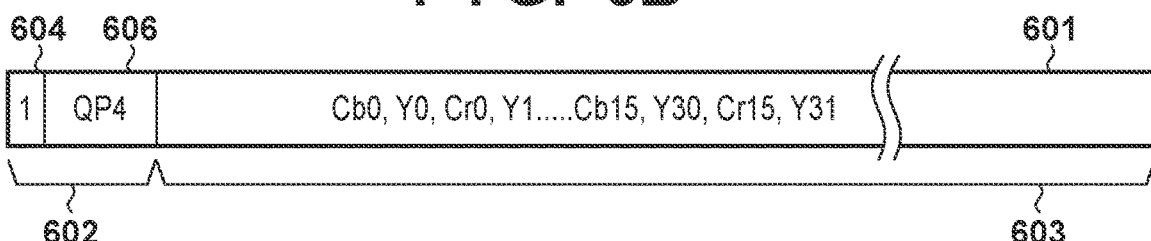
FIG. 6C
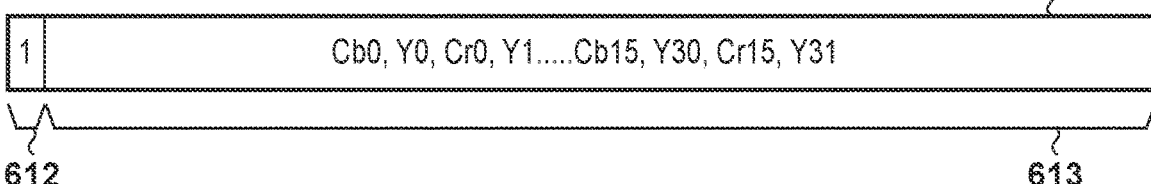

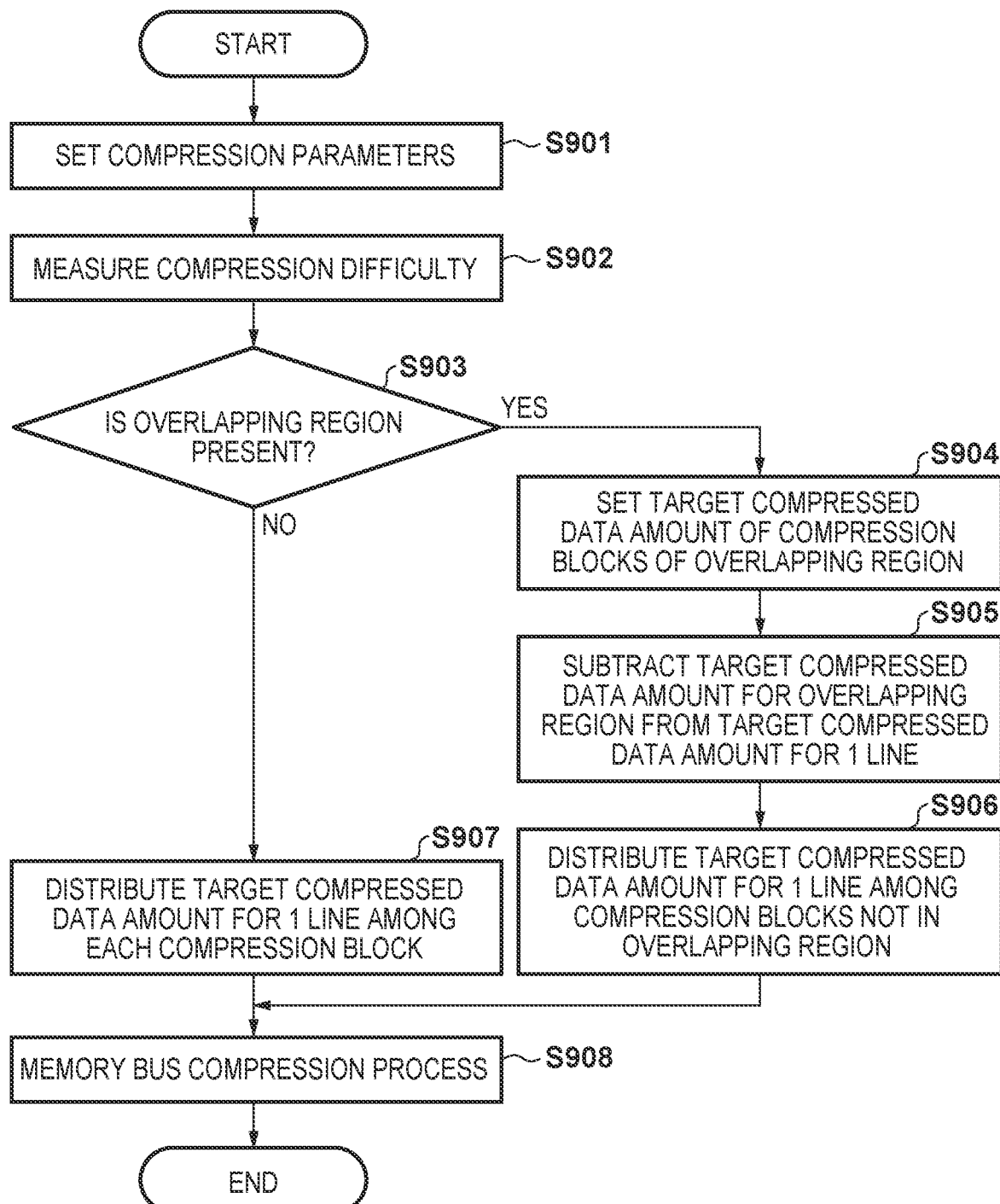

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present disclosure relates to an image processing apparatus, an image processing method, and a non-transitory computer-readable storage medium.

Description of the Related Art

Recently, increasing resolutions and framerates in image capturing apparatuses such as digital video cameras has led to a dramatic increase in the amounts of image data handled by the systems, and there is demand for higher speeds in image memory and bus interface circuits. The demand for higher speeds in circuits can be met by compressing and coding images before and after image memory, bus interfaces, and the like in order to reduce the amount of image data. In such cases, it is desirable that the coding method for image compression require only a small-scale circuit and a low coding delay. DCT-based coding methods, such as the traditional JPEG and MPEG2 methods, are unsuitable for this reason. As such, a DPCM-based predictive coding method has been proposed (see Japanese Patent Laid-Open No. 2010-004514).

In image capturing apparatuses, image data is typically stored in memory before being subjected to image processing, coding processing, and the like. An increase in data amount leads to a corresponding increase in memory accesses, which restricts the bandwidth of the memory bus. A technique for freeing up bandwidth of the memory bus by compressing the data stored in the memory (called "memory bus compression") has been proposed (see Japanese Patent Laid-Open No. 2015-170994).

In predictive coding such as that described in this proposal, fixed-length coding is carried out, where the coding length of a predetermined coding unit is fixed. Additionally, a method in which fixed-length compression is carried out on compression blocks is employed as the compression method in the memory bus compression described in the proposal.

When carrying out processing such as coding or compression at a fixed length in predetermined units of processing, there may be an insufficient or excessive amount of data, depending on the image characteristics. Accordingly, it is necessary to assign appropriate coding lengths for individual units of processing while maintaining the processing based on fixed lengths.

SUMMARY OF THE INVENTION

The present disclosure provides a technique for making it possible to assign appropriate data amounts for units of processing while carrying out processing based on a fixed length.

One aspect of exemplary embodiments relates to an image processing apparatus comprising, a code amount calculation unit configured to calculate a code amount obtained upon coding a coding block, the coding block being obtained by dividing an image to be processed, a determination unit configured to, on the basis of a reference code amount and the code amount calculated by the code amount calculation unit for each of coding blocks in a coding group including a plurality of coding blocks, determine an assigned code amount to be assigned to each of the coding blocks, and a coding unit configured to generate coded data by coding each of the coding blocks using the assigned code amount as a target code amount, wherein the determination unit determines the assigned code amount so that a total of the assigned code amounts of the coding blocks in the coding group is the same among a plurality of coding groups, and the coding unit carries out fixed-length coding on a coding group-by-coding group basis by coding using the determined assigned code amounts.

Further features of the invention will become apparent from the following description of exemplary embodiments (with reference to the attached drawings).

BRIEF DESCRIPTION OF THE DRAWINGS

FIG. 1A is a diagram illustrating the configuration of an image coding unit 100 according to one exemplary embodiment.

FIG. 1B is a diagram illustrating the configuration of pixels in each color plane of image data, according to one exemplary embodiment.

FIG. 1C is a diagram illustrating the configuration of a coding core unit 110 according to one exemplary embodiment.

FIG. 6A is a diagram illustrating an example of code amounts for each of QPs according to one exemplary embodiment.

FIG. 6B is a diagram illustrating an example of the data structure of a DPCM mode coding format.

FIG. 6C is a diagram illustrating an example of the data structure of a PCM mode coding format.

FIG. 9 is a flowchart illustrating an example of a compression process according to another exemplary embodiment.

DESCRIPTION OF THE EMBODIMENTS

Figure 2:
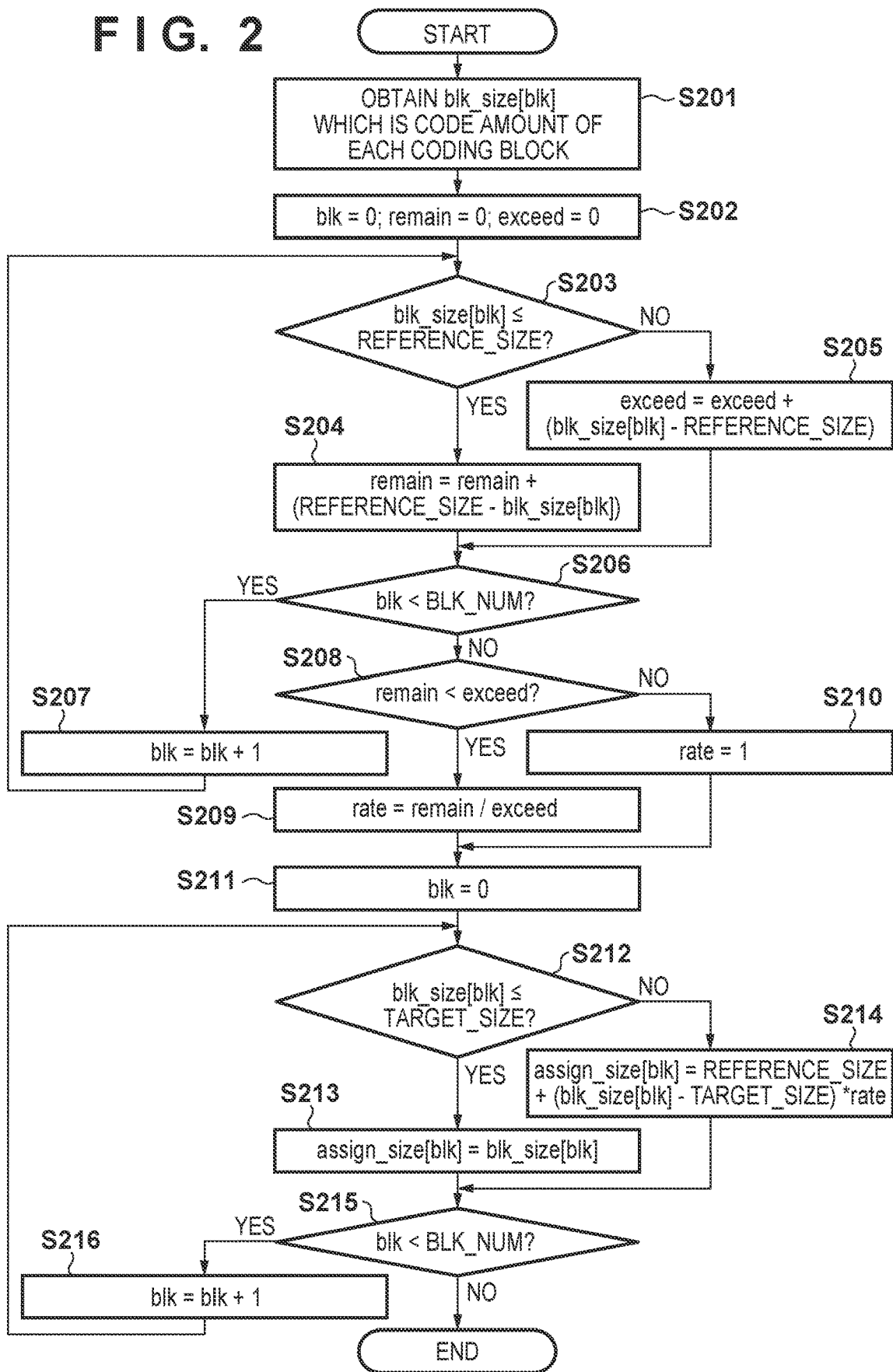
FIG. 2 is a flowchart illustrating an example of a code amount assignment process according to one exemplary embodiment.

Exemplary embodiments will be described in detail hereinafter with reference to the drawings.

First Exemplary Embodiment

One exemplary embodiment will be described below. The present exemplary embodiment describes an image coding unit provided in an image capturing apparatus as an example of an image processing apparatus according to the exemplary embodiment. Although the following describes a configuration in which the image coding unit is included in the image capturing apparatus, the image coding unit itself may be taken as a single apparatus and implemented as an image coding apparatus.

FIG. 1A is a block diagram illustrating an example of the configuration of an image coding unit 100 included in the image capturing apparatus according to the present exemplary embodiment. The configuration of the image coding unit 100 according to the present exemplary embodiment will be described next in terms of the operations carried out by each block. The image coding unit 100 illustrated in FIG. 1A is constituted by a code amount calculation unit 103, a code amount assignment unit 104, a delay unit 105, and a coding unit 106.

The image coding unit 100 divides image data to be processed into coding blocks of a predetermined size, and taking those blocks as coding target blocks, carries out a coding process on each coding block. The image data signals in the present exemplary embodiment are in the YCbCr 4:2:2 format, with a luma signal Y and chroma signals Cb and Cr, and have a bit depth of 10 bits. The following descriptions assume that the size of the coding block is 32 horizontal pixels×1 vertical pixel for the luma signal Y, 16 horizontal pixels×1 vertical pixel for the chroma signal Cb, and 16 horizontal pixels×1 vertical pixel for the chroma signal Cr, for a total of 64 pixels in a single coding block, with an average compression rate of 6/10.

In the present exemplary embodiment, the image data signal format is not limited to YCbCr, and may instead be image data in a format such as grayscale, RGB, Bayer array data, or the like. The number of bits in the image data is not limited to 10, and may be 8, 12, or the like. Furthermore, the coding block size is not limited to 32 horizontal pixels×1 vertical pixel, and any desired size may be used. For example, a two-dimensional structure such as 8 horizontal pixels×8 vertical pixels may be used.

The pixels in each color plane of the image data divided into coding blocks are multiplexed in the order Cb0, Y0, Cr0, Y1, and so on, as indicated in FIG. 1B, and are input to the image coding unit 100 via an input terminal 101. The image data input to the input terminal 101 may be, for example, image data output from an image capturing unit 801, described later with reference to FIG. 8, or may be image data stored in memory 805.

Next, with reference to FIG. 1C, a coding core unit 110, among the blocks constituting the image coding unit 100 according to the present exemplary embodiment, will be described as a specific element of the code amount calculation unit 103. FIG. 1C is a block diagram illustrating the configuration of the coding core unit 110. In FIG. 1C, image data, quantization parameters ("QP" hereinafter), and a coding mode are input from the exterior.

A subtractor 111 calculates predictive difference data by subtracting a predictive value generated by a predictive value generation unit 115 (described later) from each pixel in the input image data. The predictive difference data is data having a positive or negative value, which is near 0 in flat areas where the image data varies little, but is a large difference value in edge areas and the like where the image data varies significantly. The predictive difference data typically has Laplacian distribution characteristics centered on 0. A selector 117 is a selector that switches the image data in accordance with the coding mode. The selector 117 selects the predictive difference data from the subtractor 111 when the coding mode is DPCM mode, selects the input image data when the coding mode is PCM mode, and outputs the selected image data to a quantizing unit 112. The coding mode will be described later.

The quantizing unit 112 quantizes the data output from the selector 117 using a quantizing step corresponding to the QP. The quantizing step becomes finer the lower the QP is, and becomes rougher the greater the QP is. The quantizing step is 1 when the QP is 0. When the quantizing step is 1, the input value is output as-is, which corresponds to lossless coding in which the quantization produces no degradation. The data that has been quantized is output as quantized data to an inverse quantizing unit 113, a variable-length coding unit 116, and the exterior of the coding core unit 110.

The inverse quantizing unit 113 inverse-quantizes the quantized data output from the quantizing unit 112 using the same quantizing step as that used by the quantizing unit 112. An adder 114 calculates a decoding value by adding the quantized data that has been inverse-quantized and the predictive value (described later). The predictive value generation unit 115 generates the predictive value (a predictive image) from the decoding value. The predictive value generation unit 115 holds a decoding value for at least one pixel for each of the Y, Cb, and Cr color planes, and generates the predictive value using the decoding value from the same color plane as the coding target pixel. For example, the decoding value on the left side of the coding target pixel can be used as the predictive value. Note that there is no decoding value for the first pixel in the coding block, and thus a predetermined value is used as the predictive value. For example, an intermediate value in the signal range (512, when the bit depth is 10 bits) or the like can be used.

The variable-length coding unit 116 carries out a coding process on the input quantized data using a predetermined variable-length coding method, and outputs code data and a code length for each pixel. Huffman coding, Gromm coding, or the like are examples of the predetermined variable-length coding method. In the coding process carried out by the variable-length coding unit 116, the code data having the shortest code length is assigned when the input value is 0, and code data having longer code lengths are assigned as the absolute value of the input value increases. When the input data is quantized data of the predictive difference data, the data has Laplacian distribution characteristics centered on 0 as described earlier, with a higher frequency of occurrence near 0 and a lower frequency of occurrence as the absolute value of the predictive difference data increases. By assigning shorter code data to values having a higher frequency of occurrence and longer code data to values having a lower frequency of occurrence, the overall code length of the coding block can be reduced.

The coding modes will be described here. The Differential Pulse Code Modulation (DPCM) mode and the Pulse Code Modulation (PCM) mode are the coding modes used by the coding core unit 110. The DPCM mode is a mode in which, for each pixel in a coding block, a difference in the pixel value from another pixel is quantized according to a predetermined quantizing step and then subjected to variable-length coding, and the code amount of the result is then calculated. To be more specific, the DPCM mode is a mode in which the predictive difference data is generated by the subtractor 111, quantized by the quantizing unit 112, and subjected to variable-length coding by the variable-length coding unit 116, and is a coding mode in which variable-length code based on the image data, QP, and the like is generated. On the other hand, the PCM mode is a mode in which the input image data is quantized as-is by the quantizing unit 112 and output as quantized data, and is a coding mode that generates unique fixed-length code based on the QP.

Returning to FIG. 1A, the descriptions of the image coding unit 100 will be continued. As illustrated in FIG. 1A, the image data input to the image coding unit 100 is input to the code amount calculation unit 103. The image data is input to the code amount calculation unit 103, as well as a QP of 0 and the DPCM mode as the coding mode. As a result, the code amount calculation unit 103 carries out a coding process in the DPCM mode with a QP of 0, i.e., a quantizing step of 1, and a code length is output on a pixel-by-pixel basis. As illustrated in FIG. 1B, the image data is input one pixel at a time, i.e., Cb0, Y0, Cr0, Y1, and so on, and the code lengths are also output one pixel at a time in the same order.

Here, because the quantizing step is 1, the code length is calculated in a lossless state, in which the quantization produces no coding error whatsoever. By doing so, code amounts capable of lossless coding are assigned to flat blocks. If it is not necessary to do so, a QP in which the quantizing step is greater than 1 may be used. The code amount calculation unit 103 can be configured as the coding core unit 110 illustrated in FIG. 1C, and although the quantized data, code data, and code length are included in the output signal, only the code length is used here. The code amount calculation unit 103 outputs the code length to the code amount assignment unit 104.

Next, the code amount assignment unit 104 assigns a code amount to each coding block, using the code length for each pixel provided by the code amount calculation unit 103. The code amount that has been assigned (the assigned code amount) is output to the coding unit 106. The delay unit 105 delays the image data and outputs the image data to the coding unit 106 for a period in which the code amount calculation unit 103 and the code amount assignment unit 104 execute the code amount calculation and code amount assignment process for a plurality of coding blocks present in a coding group (described later). As a result, the coding unit 106 can code the input coding block using the assigned code amount calculated for that coding block. The coding unit 106 executes the coding process, using the assigned code amount specified for each coding block, on the image data input at a delay from the delay unit 105.

The processing carried out by the code amount assignment unit 104 will be described in detail next. In the present exemplary embodiment, a fixed-length code amount is assigned to a single group of a plurality of coding blocks. This plurality of coding blocks will be called a "coding group" hereinafter. The coding group can also be called a "fixed-length period". The code amount assignment unit 104 determines the code amount to assign to each coding block included in the coding group, on a coding group-by-coding group basis. Any number of coding blocks can constitute a coding group, e.g., two or more blocks, or a single line, a single frame, or the like of the image data may be used.

Operations of the code amount assignment unit 104 will be described with reference to the flowchart in FIG. 2. FIG. 2 is a flowchart illustrating an example of a code amount assignment process according to the present exemplary embodiment. This code amount assignment process is executed for each coding group. When the process is started, first, in S201, the code amount assignment unit 104 calculates the total code amount of the coding block from the code length of each of the pixels output from the code amount calculation unit 103, and obtains a code amount for each of the plurality of coding blocks belonging to the coding group. The code amount obtained for each coding block at this time is represented by blk_size[blk], with a block number blk serving as an element.

Next, in S202, the code amount assignment unit 104 resets variables "blk", "remain", and "exceed", which are used in this process, to 0. Next, in S203, the code amount blk_size[blk] of the coding block corresponding to the value of blk is compared with a reference code amount REFERENCE_SIZE of the coding block. If the code amount of the coding block is less than or equal to the reference code amount ("YES" in S203), the process moves to S204. In S204, the code amount assignment unit 104 totals the amount by which the code amount of the coding block is less than the reference code amount as a remaining code amount code "remain", after which the process moves to S206. However, if the code amount of the coding block is greater than the reference code amount ("NO" in S203), the process moves to S205. In S205, the amount by which the code amount of the coding block exceeds the reference code amount is totaled as an excessive code amount "exceed", after which the process moves to S206.

As a result, for "remain", the values of the differences between the code amounts and the reference code amount are totaled for the coding blocks, among the plurality of coding blocks belonging to the coding group, that are lower than the reference code amount. On the other hand, for "exceed", the differences between the code amounts and the reference code amount are totaled for the coding blocks exceeding the reference code amount.

Next, in S206, the code amount assignment unit 104 determines whether or not the value of blk is lower than BLK_NUM, which indicates the number of coding blocks in the coding group, i.e., whether or not an unprocessed coding block remains. If an unprocessed coding block remains ("YES" in S206), in S207, the value of blk is updated to 1, after which the process returns to S203, the next block is selected, and the foregoing process is repeated. However, if no unprocessed coding blocks remain ("NO" in S206), the process moves to S208.

In S208, the code amount assignment unit 104 compares "remain" and "exceed", and if "remain" is lower than "exceed" ("YES" in S208), in S209, an increase rate "rate" is obtained by calculating "remain"/"exceed". On the other hand, if "remain" is greater than or equal to "exceed" ("NO" in S208), in S210, the increase rate "rate" is set to 1.

Next, in S211, the variable blk is set to 0 again, and in S212, the code amount blk_size[blk] of the coding block, which corresponds to the value of blk, is compared with the reference code amount REFERENCE_SIZE. If the code amount of the coding block is less than or equal to the reference code amount ("YES" in S212), the process moves to S213. In S213, the code amount assignment unit 104 sets an assigned code amount assign_size[blk], for the coding block [blk] corresponding to a first coding block having a code amount less than or equal to the reference code amount, to the blk_size[blk], which is the code amount itself of that coding block. The process then moves to S215.

However, if the code amount of the coding block is greater than the reference code amount ("NO" in S212), the process moves to S214. In S214, the code amount assignment unit 104 sets the assigned code amount assign_size[blk], for the coding block [blk] corresponding to a second coding block having a code amount exceeding the reference code amount, on the basis of the following Expression 1, using the remainder obtained from the first coding block. The process then moves to S215.

TARGET_SIZE=TARGET_SIZE+(blk_size[blk]−TARGET_SIZE)·rate    (Expression 1)

In Expression 1, the value set in S209 or S210 is used as the value of "rate". Next, in S215, the code amount assignment unit 104 determines whether or not the value of blk is lower than BLK_NUM, i.e., whether or not an unprocessed coding block remains. If an unprocessed coding block remains ("YES" in S215), in S216, the value of blk is updated to 1, after which the process returns to S212, the next block is selected, and the foregoing process is repeated. However, if no unprocessed coding blocks remain ("NO" in S215), the process ends.

The following can be said about the assigned code amount determined as described above. First, the code amount calculation unit 103 calculates the code amount when the quantizing step is 1, i.e., the code amount resulting from lossless coding (a code amount capable of being coded without degradation). Thus with the aforementioned first coding block, a remainder relative to the reference code amount is produced even with the lossless coding, and thus taking that code amount as the assigned code amount of the block enables lossless coding with the minimum code amount. On the other hand, with the second coding block, the assigned code amount can be increased beyond the reference code amount by using this remainder.

Specifically, the increase rate is found from the ratio between the remaining code amount and the excessive code amount, the amount by which the reference code amount is exceeded is multiplied by the increase rate, and is then added to the reference code amount to calculate the assigned code amount. This makes it possible to distribute the remaining code amount from the first coding block to the second coding block without any remainder. The assigned code amount calculated in this manner is used as a target code amount in the coding process carried out by the coding unit 106, instead of the reference code amount, and thus a drop in image quality can be suppressed while implementing fixed-length coding in units of groups constituted by a plurality of coding blocks.

Figure 3:
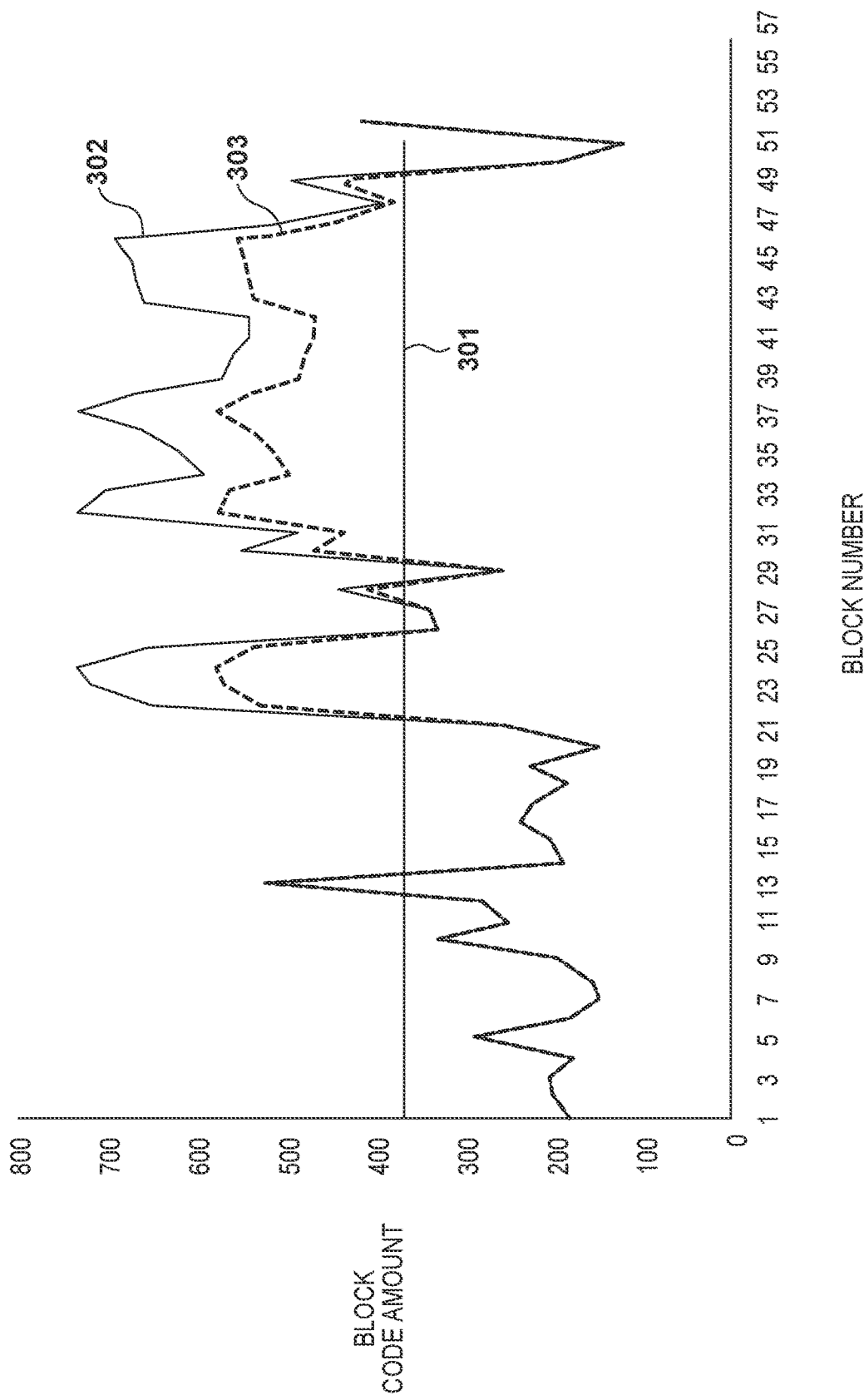
FIG. 3 is a graph illustrating an example of assigned code amounts resulting from the code amount assignment process according to one exemplary embodiment.

FIG. 3 is a graph indicating an example of a single coding group's worth of the assigned code amount calculated through this process. In the graph, the solid line 301 represents the reference code amount (384 bits). The solid line 302 represents the code amount calculated by the code amount calculation unit 103 for each coding block. The dotted line 303 represents the assigned code amount found through the above-described assignment process. If, unlike the assignment process according to the present exemplary embodiment, an assignment method that uses fixed code amounts is used, the same code amount of 384 bits will be assigned to all of the blocks. However, with the assignment process according to the present exemplary embodiment, code amounts of from 170 to 600 bits can be assigned in accordance with the code amounts generated in the blocks, while also maintaining the fixed-length code amount for the coding group as a whole.

Figure 4:
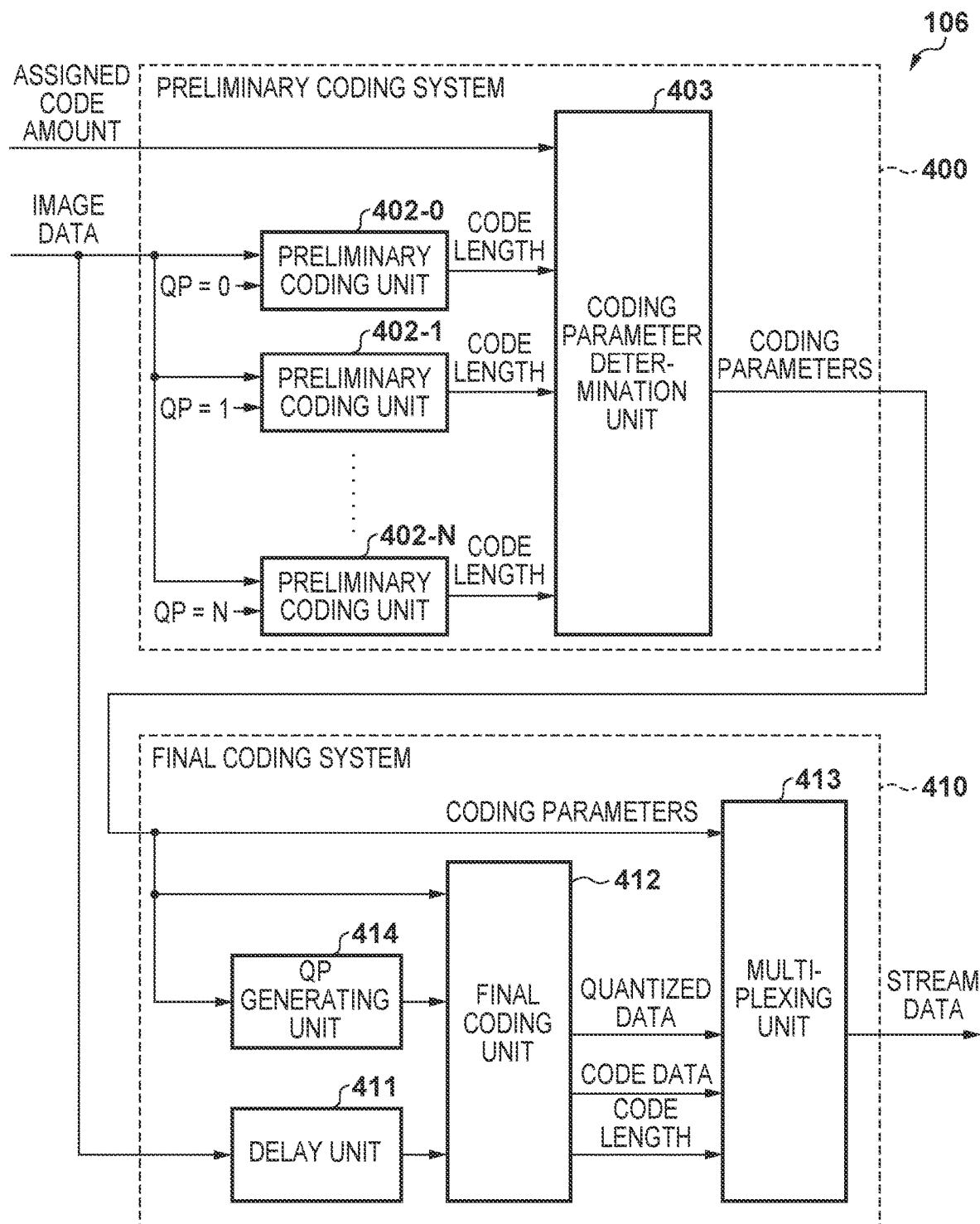
FIG. 4 is a block diagram illustrating an example of the configuration of a coding unit 106 according to one exemplary embodiment.

The internal configuration of the coding unit 106 will be described next with reference to FIG. 4. The coding unit 106 illustrated in FIG. 4 is constituted by two major blocks, namely a preliminary coding system 400 and a final coding system 410. Furthermore, the preliminary coding system 400 includes preliminary coding units 402-0 to 402-N and a coding parameter determination unit 403, and the final coding system 410 includes a delay unit 411, a final coding unit 412, a multiplexing unit 413, and a QP generating unit 414.

The preliminary coding system 400 will be described first. Image data input to the preliminary coding system 400 is input to the plurality of preliminary coding units 402-0 to 402-N. Here, N corresponds to the number of QP used (from 0 to N). The preliminary coding units 402-0 to 402-N carry out preliminary coding processes using the plurality of different QP (0-N), respectively, and sequentially output, on a pixel-by-pixel basis, the code lengths obtained from the coding processes carried out using each QP. As illustrated in FIG. 1B, the image data is input one pixel at a time, i.e., Cb0, Y0, Cr0, Y1, and so on, and the code lengths are also output one pixel at a time in the same order. The preliminary coding units 402-0 to 402-N correspond to the above-described coding core unit 110, and output quantized data, code data, and code lengths as output signals; however, only the code lengths are used in the preliminary coding system 400. The code lengths from the preliminary coding units 402-0 to 402-N are output to the coding parameter determination unit 403.

On the basis of the code lengths for each of the plurality of QPs obtained from the preliminary coding units 402-0 to 402-N and the assigned code amount, the coding parameter determination unit 403 determines, for each coding block, the coding mode and optimal QP at which the produced code amount will be less than or equal to the assigned code amount. The coding parameter determination unit 403 outputs the determined coding parameters to the final coding system 410.

Figure 5A:
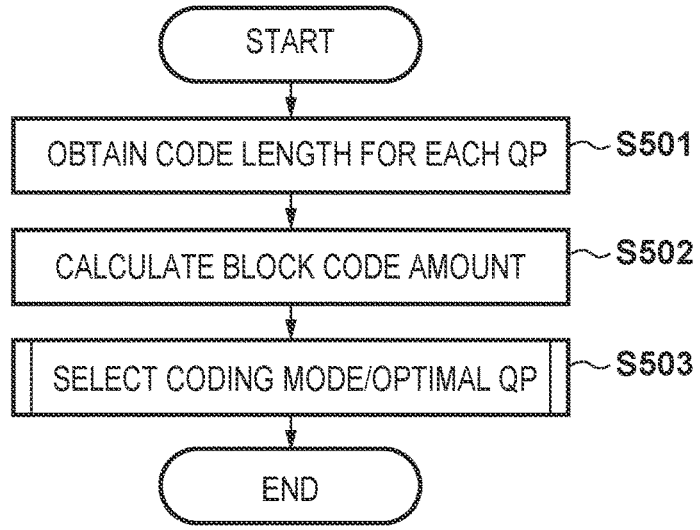
FIG. 5A is a flowchart illustrating an example of a processing sequence carried out by a coding parameter determination unit 403 according to one exemplary embodiment.

The processing carried out by the coding parameter determination unit 403 will be described in detail hereinafter. The processing sequence of the coding parameter determination unit 403 according to the present exemplary embodiment will be described with reference to FIGS. 5A and 5B. As illustrated in FIG. 5A, when the process is started for each coding block, in S501, the coding parameter determination unit 403 obtains, from each of the preliminary coding units 402-0 to 402-N, the code length obtained through the preliminary coding process using the corresponding QP, obtaining the code lengths on a pixel-by-pixel basis. Next, in S502, the coding parameter determination unit 403 totals the code lengths obtained on a pixel-by-pixel basis for the number of pixels present in a single coding block, and finds the overall code amount of the coding block. This code amount is calculated for each QP. The code amount calculated in the present exemplary embodiment is expressed as "block code amount: bl_size[qp]", taking the QP value: qp as an element.

Next, in S503, on the basis of the block code amount bl_size[qp] calculated in S502, the assigned code amount, and the code amount according to the PCM mode, the coding parameter determination unit 403 determines the coding mode and optimum QP for the coding of that coding block.

Figure 5B:
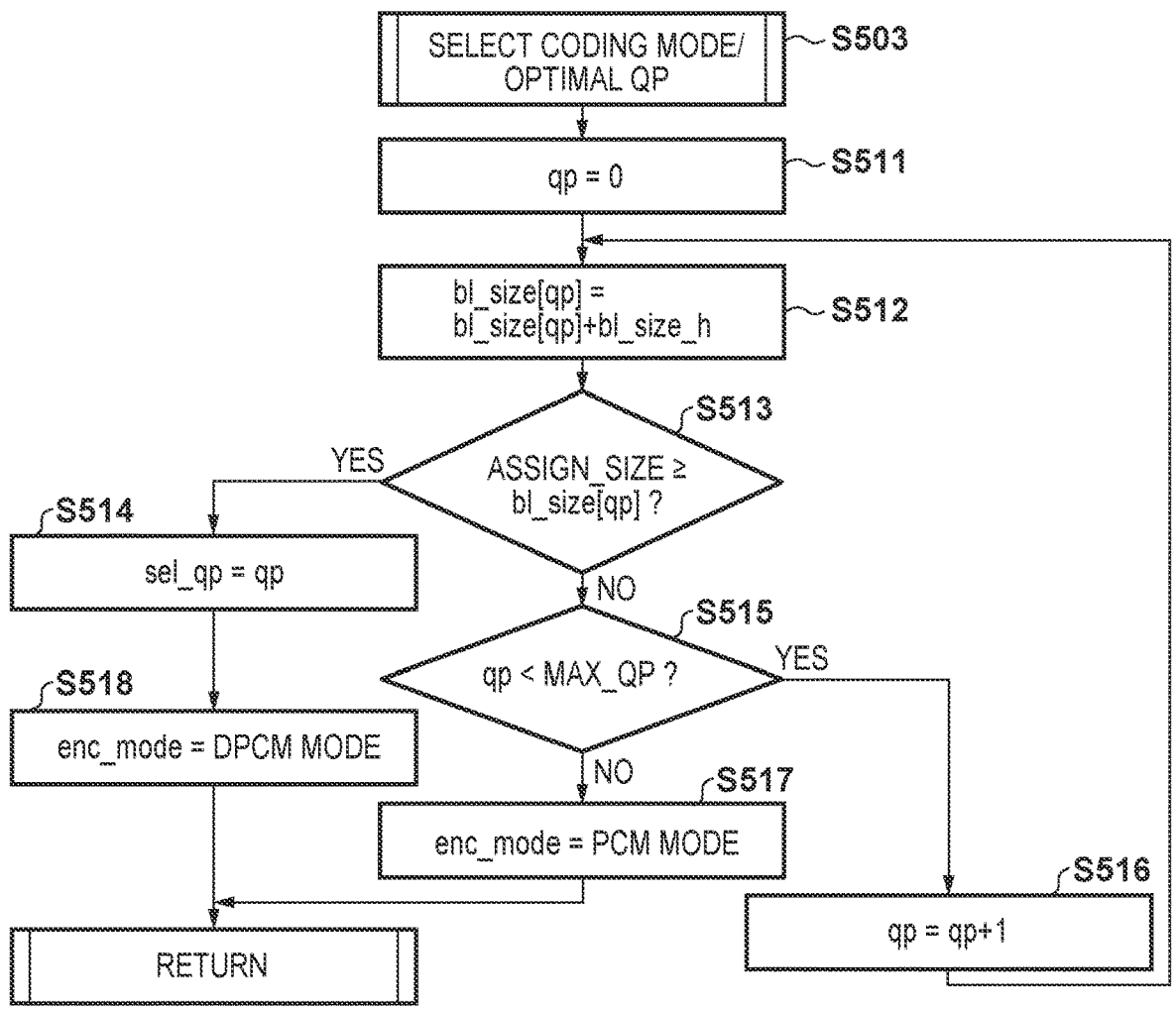
FIG. 5B is a flowchart illustrating an example of a coding mode/optimal QP determination process according to one exemplary embodiment.

The process of S503 will be described in detail next with reference to the flowchart in FIG. 5B. FIG. 5B is a flowchart illustrating an example of a process for determining the coding mode/optimal QP according to the present exemplary embodiment. Generally speaking, the processing selects the lowest QP at which the code amount of the block becomes less than or equal to the assigned code amount, using the code amount for each QP, and further determines the coding mode.

First, in S511, the coding parameter determination unit 403 resets (sets to 0) the variable qp used to calculate the code amount in the processing. Next, in S512, the code amount of the coding block as a whole, obtained if the coding process is carried out through a quantizing process based on the value of qp currently set, is calculated. The code amount of the coding block can be calculated by adding the code amount bl_size[qp] obtained from the preliminary coding units and a code amount bl_size h of header information required for each coding block. The data amount of the header information is, for example, a total of 5 bits, i.e., 1 bit indicating the coding mode and 4 bits indicating the QP value.

Next, in S513, the coding parameter determination unit 403 determines whether or not the calculated code amount of the coding block is less than or equal to the assigned code amount ASSIGN_SIZE assigned to the corresponding coding block. If the code amount of the coding block is less than or equal to the assigned code amount ASSIGN_SIZE ("YES" in S513), the process moves to S514. The coding parameter determination unit 403 sets the qp value at this time to a variable sel_qp as the optimum QP in S514, sets the coding mode enc_mode to DPCM mode in S518, and then ends the process.

If the code amount of the coding block exceeds the assigned code amount ASSIGN_SIZE ("NO" in S513), the process moves to S515, where it is determined whether or not the value of qp is less than a maximum value MAX_QP. If the value of qp is less than the maximum value ("YES" in S515), the process moves to S516, where the value of qp is incremented. The process then returns to S512, where the process is repeated, and a QP at which the code amount is less than or equal to the assigned code amount is selected. However, if the value of qp matches the maximum value ("NO" in S515), the process moves to S517.

The value of qp being determined to match the maximum value in S515 means that the code amount produced in the coding block will not be less than or equal to the assigned code amount no matter which QP value is used. In this case, fixed-length coding cannot be achieved by coding in DPCM mode, and thus the coding mode is set to PCM mode. In S517, the coding mode enc_mode is set to PCM mode, after which the process ends.

A specific example of the method for selecting the optimum QP will be described next with reference to FIG. 6A. FIG. 6A is a table illustrating an example of code amounts (bits) for the luma signal and chroma signals when the coding block undergoes preliminary coding with QPs of 0 to 15. In this table 600, the assigned code amount ASSIGN_SIZE is assumed to be 384 bits, and MAX_QP is assumed to be 15. If a chroma priority mode for the coding block is deactivated, the lowest qp at which a total data amount obtained by totaling the header code amount, the luma signal code amount, and the chroma signal code amount is less than or equal to the assigned code amount of 384 is a qp of 7, where the stated total is 378 bits.

The coding mode and optimum QP value determined in this manner will be called "coding parameters" in the present exemplary embodiment. The coding parameter determination unit 403 can determine the coding parameters in the manner described above.

Returning to FIG. 4, the final coding system 410 will be described next. The image data input to the preliminary coding system 400 is also input to the final coding system 410, and is supplied to the delay unit 411. The delay unit 411 delays the input image data by an amount equivalent to the processing cycle necessary for the preliminary coding system 400 to generate the coding parameters, after which the input image data is output to the final coding unit 412. As a result, the final coding unit 412 can subject the same coding block as that processed by the preliminary coding system 400, to a coding process using the coding mode and the optimum QP value determined by the preliminary coding system 400.

The final coding unit 412 can be configured in the same manner as the above-described coding core unit 110. The final coding unit 412 executes a final coding process, which codes the delayed image data, using the coding parameters determined by the preliminary coding system 400. The final coding process generates code data having the same code length as the block code length calculated by the coding parameter determination unit 403, and that code data is output to the multiplexing unit 413.

The QP generating unit 414 generates the QP on a pixel-by-pixel basis in accordance with the coding parameters, when it is necessary to apply different QPs to individual pixels in the coding block, and outputs the QPs to the final coding unit 412. This operation will be described in detail later. The code data, code length, and quantized data from the final coding unit 412 and the coding parameters from the coding parameter determination unit 403 are input to the multiplexing unit 413, multiplexed according to a predetermined format on a coding block-by-coding block basis, and output as stream data. The stream data is output to an output terminal 102, illustrated in FIG. 1A, and is furthermore output to image memory, a bus interface, and the like (not shown).

The format of the stream data will be described here with reference to FIGS. 6B and 6C. FIG. 6B is a diagram illustrating an example of the data structure of a format when the coding mode is the DPCM mode, and here, coded data 601 of the overall block is configured including a header portion 602 (5 bits) and a pixel data portion 603 (variable length). The header portion 602 includes a coding mode 604 (1 bit) and an optimum QP value 606 (4 bits). Variable-length code data corresponding to the number of pixels (64 pixels' worth) is stored in the pixel data portion 603.

FIG. 6C is a diagram illustrating an example of the data structure of a format when the coding mode is the PCM mode, and here, coded data 611 of the overall block is configured including a header portion 612 (1 bit) and a pixel data portion 613 (383 bits). The header portion 612 holds the coding mode (1 bit), and the pixel data portion 613 holds PCM data corresponding to the number of pixels (64 pixels' worth).

A coding method used in the PCM mode will be described here. The PCM mode is a coding mode used when the code amount produced in the DPCM mode exceeds the assigned code amount. As illustrated in FIG. 6C, the data structure in PCM mode includes 1 bit for the coding mode, indicating PCM mode, in the header portion 612, and the PCM data in the pixel data portion 613. The PCM data is data in which all pixels have been quantized at a fixed length. 1 bit is used for the header portion 612, and thus one pixel in the coding block is quantized with 1 less bit than the other pixels. For example, in the present exemplary embodiment, the first pixel Y0 of the luma signal is quantized to 5 bits, whereas 63 pixels, i.e., the other 31 pixels of the luma signal and the 32 pixels of the chroma signals, are quantized to 6 bits. Doing so makes it possible to code the data at 384 bits, i.e., 1 bit for the header portion and 383 bits for the pixel data portion.

Operations performed by the QP generating unit 414 will be described next. If the coding mode is DPCM mode, the QP generating unit 414 generates and outputs the QP for each pixel so that the optimum QP determined by the coding parameter determination unit 403 is applied. If the coding mode is PCM mode, the QP is generated and output so that the quantization used in PCM mode as described above is applied. For example, the QPs are generated and output so that a QP quantized to 5 bits is applied to the first pixel in the luma signal, and a QP quantized 6 bits is applied to the other pixels.

According to the present exemplary embodiment as described thus far, the code amount calculation unit 103 calculates a code length for each coding block assuming that each coding block is coded using a predetermined QP, and an assigned code amount is determined by the code amount assignment unit 104 for each coding block on the basis of a code amount calculated using the total code length for the coding group. By coding the image data using the assigned code amounts, the coding unit 106 can achieve variable-length coding for individual coding blocks while at the same time achieving fixed-length coding for a group constituted by a plurality of the coding blocks.

When a DPCM-based predictive coding method is used, the image quality is likely to drop in images where sharp edges are present locally, even if the periphery is a flat image. However, according to the present exemplary embodiment, a greater code amount can be assigned to coding blocks where such edges are present, which makes it possible to suppress degradation in the coding of an image where the peripheral image is flat but sharp edges are present locally.

Second Exemplary Embodiment

Another exemplary embodiment will be described next. The foregoing first exemplary embodiment describes a configuration in which the image capturing apparatus carries out the coding process. Specifically, a configuration is described in which, when coding an image while switching the coding mode between PCM mode and DPCM mode, variable-length coding can be achieved for individual coding blocks while at the same time achieving fixed-length coding for a group constituted by a plurality of the coding blocks.

As opposed to this, the present exemplary embodiment describes an image processing unit provided in an image capturing apparatus as an example of an image processing apparatus according to the exemplary embodiment. The image processing unit in the image capturing apparatus executes a demosaicing process, noise removal, a distortion correction process, and the like, and can, for example, carry out these processes having divided the image (horizontally, vertically, into quadrants, or the like). In this case, it is necessary that each divided region of the image data recorded into memory be randomly accessible, and thus fixed-length compression is selected as the compression method for the memory bus compression process for compressing the data stored in the memory.

For example, carrying out fixed-length compression using a coding block having 32 horizontal pixels and 1 vertical pixel as the unit of compression (called a "compression block" hereinafter) makes it possible to easily determine where in the memory the data to be used in the image processing is stored, which in turn makes it possible to achieve random access.

Figure 7A:
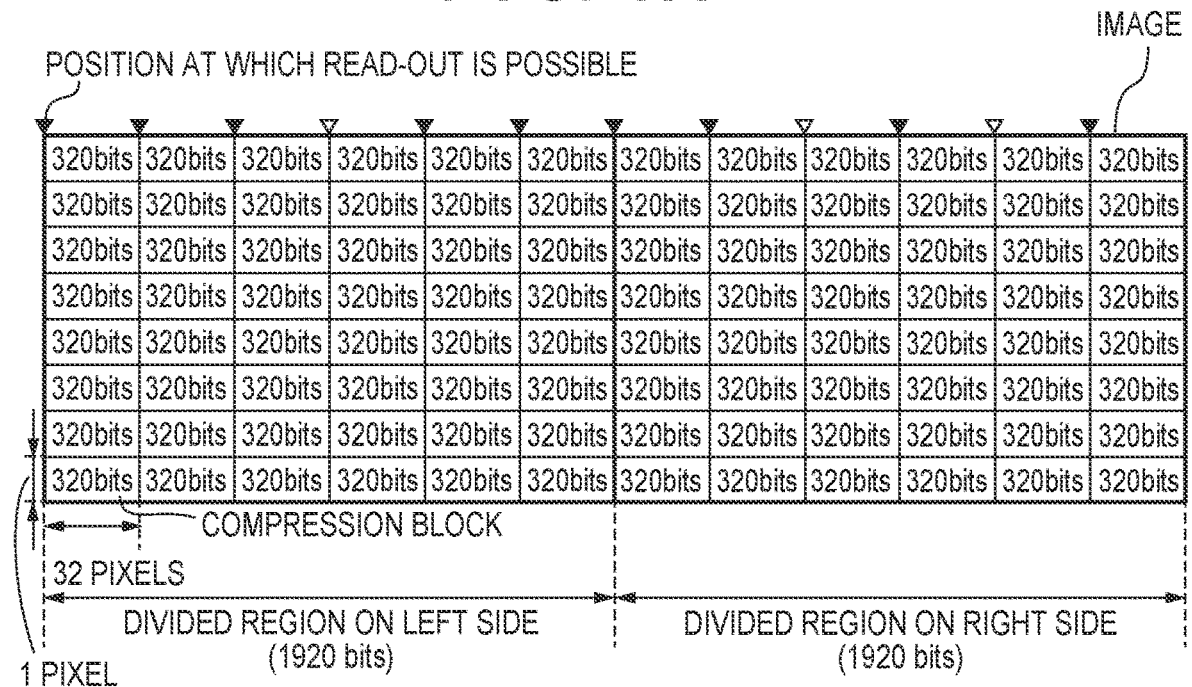
FIG. 7A is a diagram illustrating an example of compressed data amounts in compression blocks according to another exemplary embodiment.

This is illustrated in FIG. 7A. FIG. 7A illustrates a case where one image to be processed has been divided into compression blocks, which are units used for the memory bus compression process. The image is divided at the center into left and right divided regions, and the image processing is carried out using the left and right divided regions as the unit of processing. The "320 bits" in each compression block indicates a compressed data amount resulting from each compression block being compressed by memory bus compression unit. This means that in this example, a total of 640 bits, i.e., 32 luma pixels and 32 chroma pixels, each having 10 bits, has been compressed to one half the size, i.e., 320 bits. The data amount of each line divided horizontally is 1920 bits. The compression block size is not limited to 32 horizontal pixels×1 vertical pixel, and any desired size may be used. For example, a two-dimensional structure such as 8 horizontal pixels×8 vertical pixels may be used.

The black inverted triangles at the upper part of the diagram (called "black marks" hereinafter) represent read-out positions that are randomly accessible when reading out the compressed data stored in the memory. Each compression block is compressed at a fixed length of 320 bits, and thus random access is possible at the compression block level. In this example, the compression block is constituted by 32 horizontal pixels and 1 vertical pixel, and thus the coordinates of each black mark are expressed as (x,y)=(32·n, m) (where n and m are integers greater than or equal to 0), which are randomly-accessible positions (the black marks indicating the randomly-accessible positions apply not only to the uppermost line, but also in the vertical direction below the black marks).

However, if fixed-length compression is carried out on a compression block-by-compression block basis, compression blocks in which the image quality drops will arise depending on the characteristics of the image. For example, due to the properties of the memory bus compression algorithm, compression blocks having image characteristics for which a sufficient image quality cannot be maintained at 320 bits will nevertheless always be compressed at the fixed length of 320 bits, and there is thus a tendency for the image quality to drop in compression blocks having such unfavorable image characteristics. On the other hand, there are also cases where the image can be restored to the pre-compression state even when a code length less than 320 bits is used (that is, cases where there is no drop in image quality). In such cases, even code amounts less than 320 bits are sufficient to maintain the required image quality, but because each compression block is required to have 320 bits, a process such as stuffing with 0s is required, and the code amount will be used in a wasteful manner.

Figure 7B:
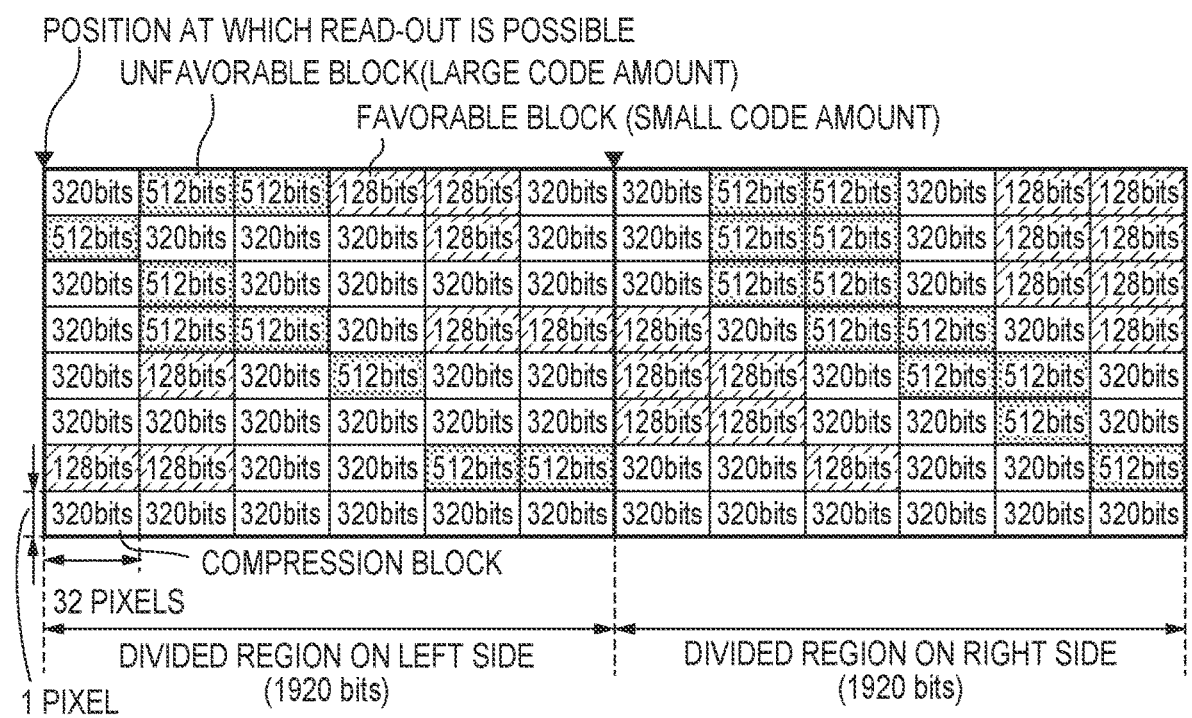
FIG. 7B is a diagram illustrating compressed data amounts redistributed in accordance with a degree of difficulty from a memory bus compression unit, according to another exemplary embodiment.

As opposed to this, rather than using a fixed-length unit for each compression block, each line in the left and right divided regions may be used as the fixed-length (1920 bits) compression unit, as indicated in FIG. 7B. Here, 6 blocks are included in a single line, and in accordance with the image characteristics, higher code amounts (512 bits) are assigned to compression blocks having a higher compression difficulty, while lower code amounts (128 bits) are assigned to compression blocks having a lower compression difficulty, which makes it possible to reduce a drop in the image quality. Additionally, in this case, the code amount in each line of the left and right divided regions is a fixed length of 1920 bits for every line, and thus the boundaries of the divisions, indicated by the black marks, correspond to randomly-accessible readout positions. Accordingly, a drop in image quality can be reduced while ensuring random accessibility.

Figure 7C:
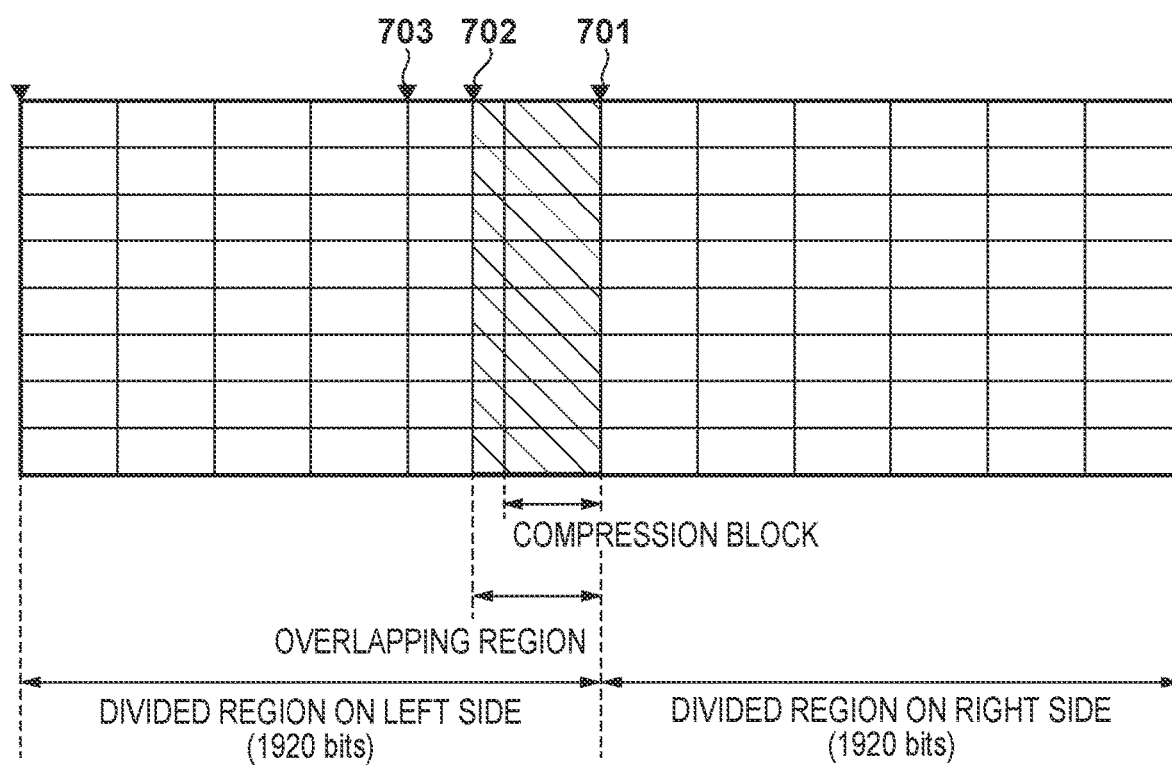
FIG. 7C is a diagram illustrating a relationship between an overlapping region and compression blocks when an image is divided into left and right parts, according to another exemplary embodiment.

However, in image processing such as noise removal processing, some processing units also require pixels outside of the divided regions. FIG. 7C illustrates an example in which the image is divided horizontally and pixels spanning a division boundary are referenced. The regions indicated by hatching are pixel regions belonging to the divided region on the left side but which must be referenced when carrying out a filtering process on the divided region on the right side. A pixel region located in a predetermined range from the division boundary in this manner is a pixel region required when processing another adjacent divided region, and such a pixel region will be called an "overlapping region" in the present exemplary embodiment.

When reading out the compressed data recorded in the memory in order to process the divided region on the right side, random access is possible from the position of a black mark 701 indicated in FIG. 7C. However, for the filtering process, the pixels from the position of a black mark 702 are necessary. Here, the number of bits at which the compression block located at the position of the black mark 702 is compressed is unknown. As such, the position in the memory at which the compression block is stored cannot be determined, and thus the block cannot be read out.

Accordingly, in the present exemplary embodiment, the compressed data amount is set to a predetermined fixed value in the overlapping region so that random accessibility can be maintained, while also carrying out the compression process using different compressed data amounts on a compression block-by-compression block basis in order to improve the image quality.

Figure 8:
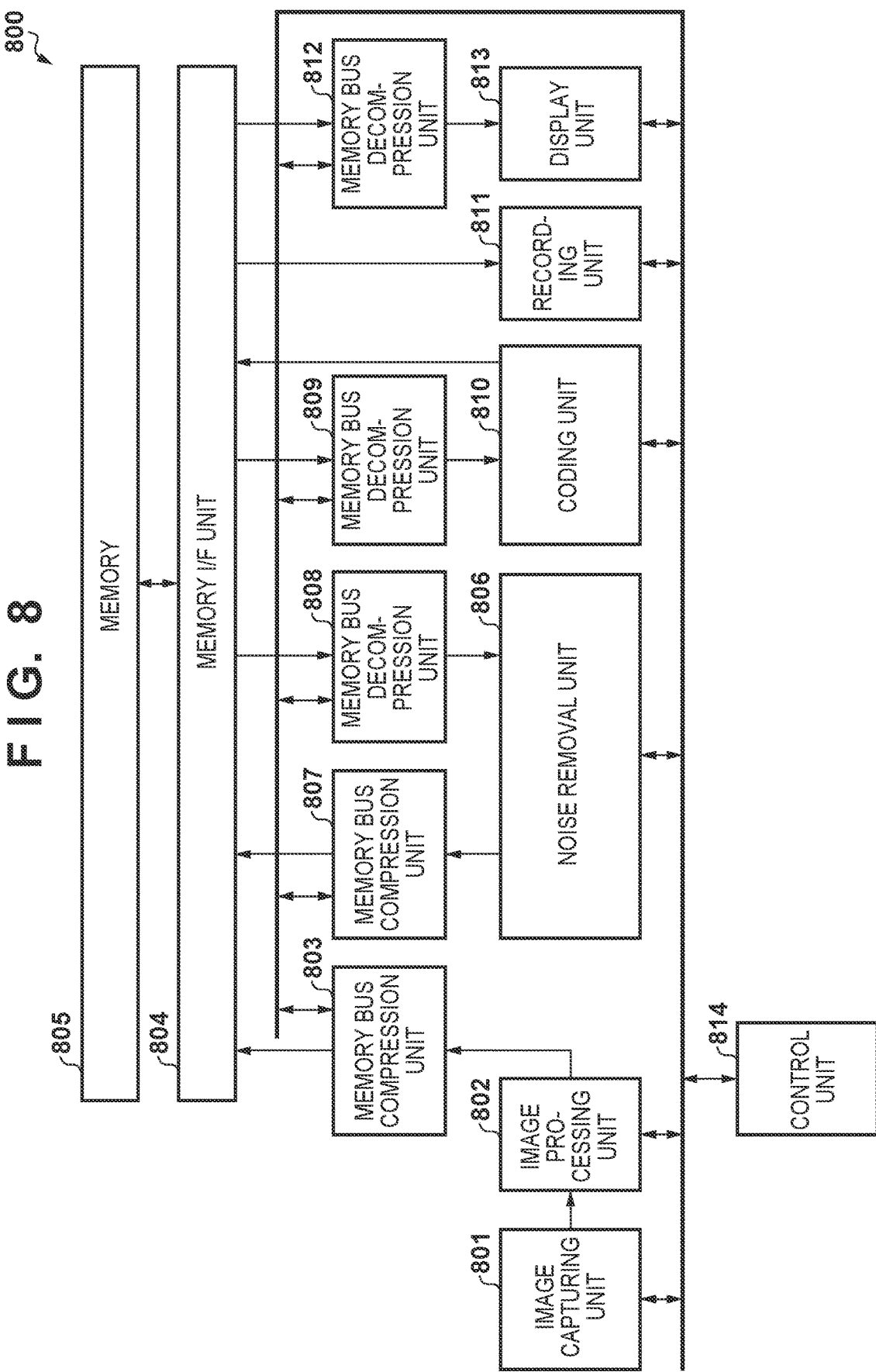
FIG. 8 is a block diagram illustrating an example of the configuration of an image processing apparatus according to another exemplary embodiment.

The configuration of the image processing unit according to the present exemplary embodiment will be described in further detail hereinafter. FIG. 8 is a block diagram illustrating an example of the configuration of an image capturing apparatus 800 according to the present exemplary embodiment. The image capturing apparatus 800 can be configured including the image capturing unit 801, an image processing unit 802, memory bus compression units 803 and 807, a memory I/F unit 804, the memory 805, a noise removal unit 806, memory bus decompression units 808, 809, and 812, a coding unit 810, a recording unit 811, a display unit 813, and a control unit 814.

The control unit 814 controls the image capturing unit 801, the image processing unit 802, the memory bus compression units 803 and 807, the noise removal unit 806, the memory bus decompression units 808, 809, and 812, the coding unit 810, the recording unit 811, and the display unit 813.

The image capturing unit 801 includes a lens optical system, which includes an optical lens, an aperture stop, a focus control unit, and a lens driving unit, and which is capable of optical zoom, as well as an image sensor such as a CCD image sensor or CMOS sensor that converts optical information from the lens optical system into an electrical signal. The image capturing unit 801 converts the electrical signal obtained from the image sensor into a digital signal expressing image data and outputs the image data to the image processing unit 802. The image processing unit 802 generates image data by subjecting the input image data to a demosaicing process, a noise removal process, an optical distortion correction process, a color correction process, and the like, and outputs the resulting image data to the memory bus compression unit 803 for storage in the memory 805.

The image processing unit 802 can divide the image horizontally and vertically and process the divided image. The memory bus compression units 803 and 807 receive compression parameters defining the compression operations, such as a compression rate, from the control unit 814, compress the image data using a low-latency compression technique for freeing up bandwidth in the memory bus, and output the generated compressed data to the memory I/F unit 804. The compression parameters may be stored in the memory 805 along with the compressed data, or may be stored in the control unit 814. If the image capturing apparatus 800 is in an operating mode in which the memory bus has sufficient bandwidth, it is also possible to output the input image data to the memory I/F unit 804 in an uncompressed state.

In the present exemplary embodiment, the memory bus compression units 803 and 807 generate a compressed image (compressed data) from an image to be processed by carrying out compression in units of compression blocks constituted by 32 horizontal pixels and 1 vertical pixel. The compression parameters used by the memory bus compression units 803 and 807 include compression rate, pixel bit depth, image format, and so on. The control unit 814 determines the compression parameters in accordance with the operating mode of the image capturing apparatus, and sets the parameters in the memory bus compression units 803 and 807. The memory I/F unit 804 governs memory access requests from the various processing units, and controls the reading out and writing of data from and to the memory 805.

The memory 805 is a storage unit, constituted by volatile memory, for example, for storing various types of data output from the processing units constituting the image capturing apparatus 800. The memory bus decompression unit 808 reads out the compressed data, which has been compressed by the memory bus compression unit 803 or 807 and stored in the memory 805, and outputs the decompressed image data to the noise removal unit 806. The memory bus decompression unit 809 reads out the compressed data, which has been compressed by the memory bus compression unit 803 or 807 and stored in the memory 805, and outputs the decompressed image data to the coding unit 810. The memory bus decompression unit 812 reads out the compressed data, which has been compressed by the memory bus compression unit 803 or 807 and stored in the memory 805, and outputs the decompressed image data to the display unit 813. If the data stored in the memory 805 is uncompressed, the memory bus decompression units 808, 809, and 812 output that data as-is to the respective destinations mentioned above.

Additionally, before starting the decompression process, parameters necessary for the decompression, such as the compression rate set for the compression by the memory bus compression unit 803 or 807, are set by the control unit 814. If the compression parameters are stored in the memory 805, the compression parameters are read out from the memory 805 first, and the parameters necessary for the decompression are set.

The noise removal unit 806 carries out a cyclical noise removal process that removes noise using the image currently being processed and an image processed in the past. After the noise removal, the image data is stored in the memory 805 via the memory bus compression unit 807. The coding unit 810 codes the image data using a high-efficiency coding method such as HEVC or H.264, and records the coded data in the recording unit 811. The recording unit 811 is a recording medium constituted by non-volatile memory, for example. The display unit 813 is a liquid crystal display, an organic EL display, or the like, for example, and displays image data read out from the memory 805.

A memory bus compression control process will be described next with reference to the flowchart in FIG. 9. The following will primarily describe control for setting a target compressed data amount for each compression block prior to carrying out the memory bus compression process. Although the sources and destinations of the inputs and outputs are different for the memory bus compression units 803 and 807, the details of the processing functions thereof are the same, and thus the memory bus compression unit 803 will be described as an example.

Figure 10A:
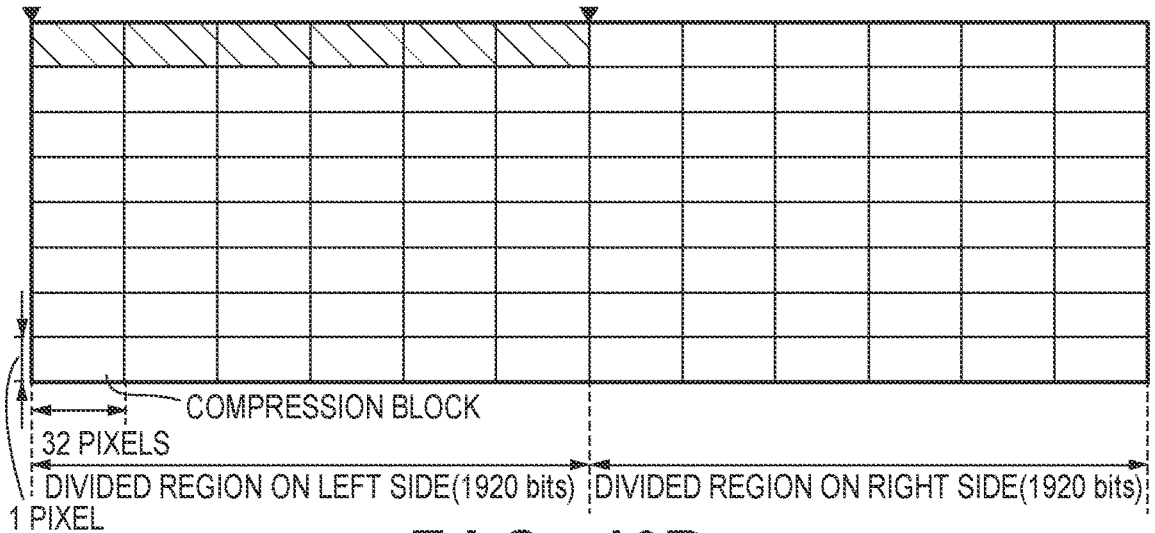
FIG. 10A is a diagram illustrating units of fixed-length compression carried out by a memory bus compression unit, according to another exemplary embodiment.

First, in S901, the control unit 814 sets the compression parameters of the memory bus compression unit 803. Then, in S902, the control unit 814 measures the degree of difficulty of the memory bus compression for the image data output from the image processing unit 802 and input to the memory bus compression unit 803. For example, the image is divided horizontally as illustrated in FIG. 10A, and each line in the resulting left and right divided regions is taken as a unit for fixed-length compression (the hatched part in FIG. 10A). In this example, 12 compression blocks are arranged horizontally in a single line, and thus each divided region has 6 compression blocks. The image data is assumed to be in the YUV 422 format, where each pixel has 10 bits, and the compression rate of the compression parameters is assumed to be ½. In this case, the target compressed data amount of a single line in each of the left and right divided regions is 32 [pixels]×2[4:2:2]×10 [bits]×6 [blocks]/2 [compression rate]=1920 [bits]. Note that the way in which the image is divided is not limited to that illustrated in FIG. 10A. Depending on the size of the image to be processed, the image may be divided into a plurality of divided regions, and the divided regions may furthermore be divided into a predetermined number of compression blocks. The compression blocks also need not be based on single lines.

Figure 10B:
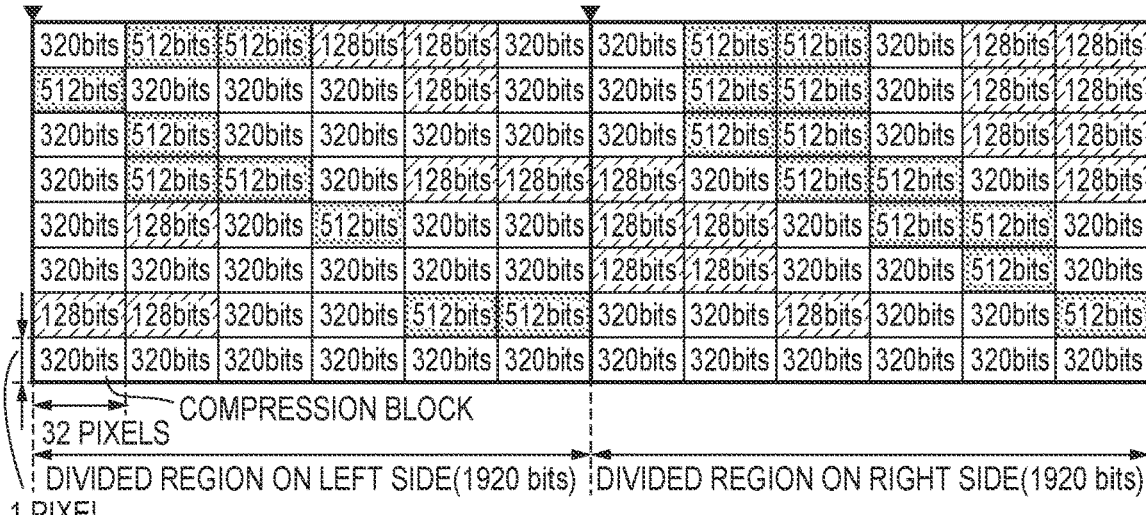
FIG. 10B is a diagram illustrating compressed data amounts redistributed in accordance with a degree of difficulty from a memory bus compression unit, according to another exemplary embodiment.

The one line indicated by the hatching in FIG. 10A is compressed once according to the predetermined quantization parameters used by the memory bus compression unit 803, and the compression difficulty for the compressed data amount in each compression block is measured at that time. Compression blocks having a compressed data amount greater than a predetermined first threshold (Th1) are determined to have a high degree of difficulty. On the other hand, compression blocks having a compressed data amount lower than a second threshold (Th2<Th1) are determined to have a low degree of difficulty, and are stored by the control unit 814. FIG. 10B illustrates a result of carrying out this process on each of the lines in each of the divided regions.

Compression blocks indicated by "512 bits" have a high degree of difficulty, and are assigned the target compressed data amount with greater frequency. Compression blocks indicated by "320 bits" are compression blocks with a compressed data amount less than or equal to the first threshold and greater than or equal to the second threshold. Compression blocks indicated by "128 bits" have a low degree of difficulty, and are assigned the target compressed data amount with lower frequency. In the present exemplary embodiment, three data amounts are used for the target compressed data amounts, namely a first value (512 bits), a second value (320 bits), and a third value (128 bits), in order from the highest data amount. However, the target compressed data amounts are not limited to being assigned in this manner, and numerical values may differ, or the number of amounts may differ.

Next, in S903, the control unit 814 determines whether or not an overlapping region is present in the divided region being processed. If an overlapping region is present ("YES" in S903), the process moves to S904. However, if no overlapping region is present ("NO" in S903), the process moves to S907. In the example illustrated in FIG. 10A, when the divided region on the left side is being processed, an overlapping region is present, whereas when the divided region on the right side is being processed, no overlapping region is present.

Then, in S904, first, the target compressed data amount is set for the compression blocks belonging to the overlapping region. The target compressed data amount of that compression block is set to a predetermined compressed data amount for the overlapping region, regardless of the result of measuring the degree of difficulty. In the present exemplary embodiment, the target compressed data amount is sent to 320 bits for all the compression blocks between the black marks 702 and 701 illustrated in FIG. 10C. Then, in S905, the target compressed data amount corresponding to the overlapping region is subtracted from the target compressed data amount of a single line. As a result, the compressed data amount that can be used for a compression block belonging to the divided region on the left side but not belonging to the overlapping region becomes 1920−(320×2)=1280 [bits]. Then, in S906, the 1280 bits obtained from the subtraction are distributed among the remaining four compression blocks not belonging to the overlapping region. At this time, the target compressed data amount is determined for each compression block on the basis of the degree of difficulty of that compression block.

In S907, a process for distributing the target compressed data amount of a single line is carried out for the divided region in which the overlapping region is not present. Here, the target compressed data amount is determined for each compression block in the one line on the basis of the degree of difficulty of that compression block. At this time, the total compressed data amount of the compression blocks in the one line is set to the compressed data amount for the unit of fixed-length compression, which in this case is 1920 bits. Although it is necessary for the number of compression blocks having a high degree of difficulty to be the same as the number of compression blocks having a low degree of difficulty, it is conceivable that the number of compression blocks determined to have a high degree of difficulty will be higher than the number of compression blocks determined to have a low degree of difficulty. In such a case, the size of the calculated compressed data amount is taken into consideration, with compression blocks for which greater compressed data amounts have been calculated being assigned 512 bits preferentially, and 320 bits being assigned to the remaining compression blocks. Likewise, if the number of compression blocks determined to have a high degree of difficulty is lower than the number of compression blocks determined to have a low degree of difficulty, the size of the calculated compressed data amount is taken into consideration, with compression blocks for which lower compressed data amounts have been calculated being assigned 128 bits preferentially, and 320 bits being assigned to the remaining compression blocks.

Once the target compressed data amount has been determined for each compression block through the processing described above, the memory bus compression unit 803 compresses the compression blocks in S908.

Figure 11:
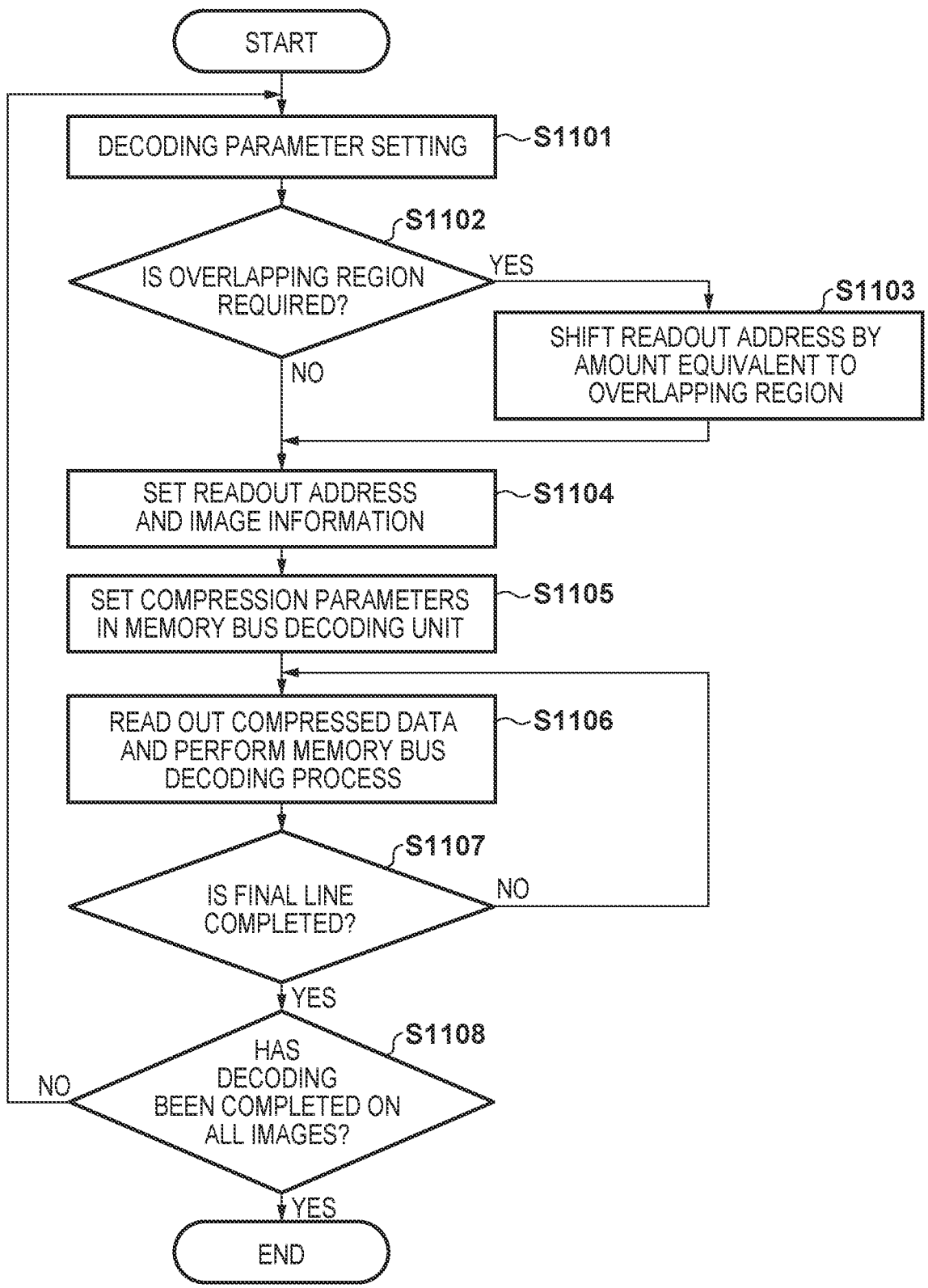
FIG. 11 is a flowchart illustrating an example of a decoding process according to another exemplary embodiment.

A process carried out when the noise removal unit 806 reads out the image data (compressed data) from the memory 805 will be described next with reference to the flowchart in FIG. 11.

First, in S1101, the control unit 814 sets decompression parameters for the noise removal unit 806 and the memory bus decompression unit 808. The "decompression parameters" are parameters necessary for decompression, such as the bit width of the pixels before memory bus compression, the compression rate used in the memory bus compression, and so on. In this step, the control unit 814 also sets the starting address of the region in the memory 805 where the compressed data compressed by the memory bus compression unit 803 or 807 is stored, the horizontal size of each divided region, and the like.

Then, in S1102, the control unit 814 determines whether or not the overlapping region is required for the noise removal process carried out on the image region read out by the noise removal unit 806. This determination is made on the basis of size information of the divided region being processed, the number of compression blocks used when the compressed data stored in the memory 805 was compressed, the compressed data amount of the compression blocks in the divided region or the overlapping region, the number of compression blocks already decoded by the memory bus decompression unit 808, and the like. If it is determined that the overlapping region is necessary ("YES" in S1102), the process moves to S1103, whereas if the overlapping region is not present ("NO" in S1102), the process moves to S1104. In S1103, the noise removal unit 806 shifts the readout address by an amount equivalent to the overlapping region.

Figure 10C:
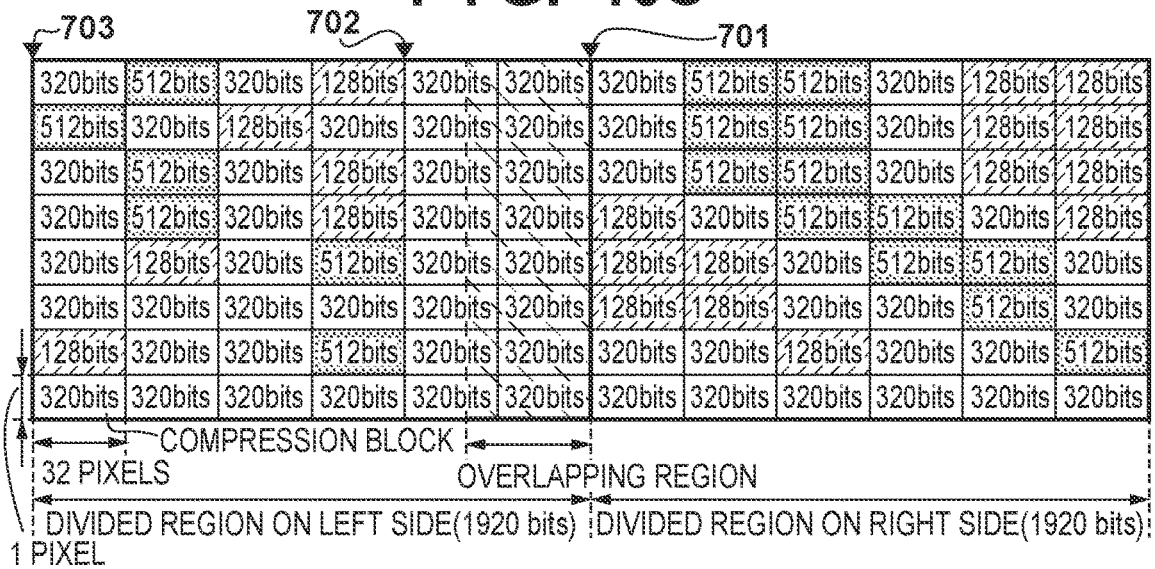
FIG. 10C is a diagram illustrating a readout position when overlap is included, according to another exemplary embodiment.

To describe this in detail with reference to FIG. 10C, FIG. 10C illustrates a state where the divided region on the left side has been read out in raster order and decompressed. The divided region on the right side is to be processed next, and the processing will therefore be carried out in raster order starting from position 701 indicated in FIG. 10C. However, the overlapping region is necessary to process the compression block at the start of each line in the divided region on the right side, and thus the compression blocks must be read out from position 702. Accordingly, because the number of compression blocks present in the overlapping region at the time of memory bus compression, the compressed data amount of the compression blocks in the overlapping region, and the like are known, the control unit 814 shifts the readout address from position 701 to position 702 in S1103.

Then, in S1104, the control unit 814 sets the readout address in the noise removal unit 806. When processing the divided region on the left side, an address for reading out from position 703 in FIG. 10C is set, whereas when processing the divided region on the right side, an address for reading out from position 702 in FIG. 10C is set. Information for reading out the image is also included, such as information indicating that the image is divided horizontally as indicated in FIG. 10C, the horizontal and vertical sizes of the resulting divided regions, and the like.

Then, in S1105, the control unit 814 sets parameters necessary for decompression in the memory bus decompression unit 808. These parameters include the compression parameters used by the memory bus compression unit 803 or 807, e.g., the bit width of the pixels prior to memory bus compression, the compression rate used in the memory bus compression, and the like. Next, in S1106, the noise removal unit 806 issues an image data (compressed data) readout request to the memory I/F unit 804 via the memory bus decompression unit 808. In response to the readout request, the memory I/F unit 804 reads out the compressed data from the memory 805 and outputs that data to the memory bus decompression unit 808. The memory bus decompression unit 808 decompresses the data in units of compression blocks in accordance with the set parameters, generates image data, and outputs the image data to the noise removal unit 806.

Then, in S1107, the noise removal unit 806 reads out the region for readout up to the final line, and determines whether or not the decompression is complete. If the readout has progressed to the final line and it is determined that the decompression is complete ("YES" in S1107), the process moves to S1108. However, if it is determined that the readout is not complete up to the final line ("NO" in S1107), the process returns to S1106, and the readout and decompression are repeated. In S1108, it is determined whether the readout and decompression is complete for the entire image. For example, when the readout and decompression is complete up to the final line in the divided region on the left side in FIG. 10C, readout is then started from the upper-left of the divided region on the right side (indicated by 402 in FIG. 4). When the readout and decompression is complete up to the final line in the divided region on the right side, the readout and decompression for the entire image is complete, and the decompression process therefore ends. Once the readout and decompression is complete, the noise removal unit 806 carries out the noise removal process on the read-out image data.

By employing operations such as those described above, random accessibility can be maintained, while at the same time carrying out decompression processes using different compressed data amounts from compression block to compression block in order to improve the image quality.

Other Embodiments

Embodiment(s) of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-093980 filed on May 15, 2018 which is hereby incorporated by reference herein in its entirety.

What is claimed is:

1. An image processing apparatus comprising:
a code amount calculation unit configured to calculate a code amount obtained upon coding a coding block, the coding block being obtained by dividing an image to be processed;
a determination unit configured to, on the basis of a reference code amount and the code amount calculated by the code amount calculation unit for each of coding blocks in a coding group including a plurality of coding blocks, determine an assigned code amount to be assigned to each of the coding blocks; and
a coding unit configured to generate coded data by coding each of the coding blocks using the assigned code amount as a target code amount,
wherein the determination unit determines the assigned code amount so that a total of the assigned code amounts of the coding blocks in the coding group is the same among a plurality of coding groups,
wherein the coding unit carries out fixed-length coding on a coding group-by-coding group basis by coding using the determined assigned code amounts,
wherein the determination unit calculates a difference between the calculated code amount and the reference code amount, and determines the assigned code amount on the basis of the difference,
wherein for first coding blocks, among the plurality of coding blocks included in the coding group, in which the calculated code amount is less than or equal to the reference code amount, the determination unit determines the assigned code amount to be equal to the calculated code amount, and
wherein for second coding blocks, among the plurality of coding blocks included in the coding group, in which the calculated code amount is greater than the reference code amount, the determination unit determines the assigned code amount by distributing, throughout the second coding blocks, a total of a difference between each of the calculated code amounts of the first coding blocks and the reference code amount.

2. The image processing apparatus according to claim 1, wherein the determination unit:
compares a first total of the difference between each of the calculated code amounts of the first coding block and the reference code amount with a second total of the difference between each of the calculated code amount of the second coding blocks and the reference code amount;
determines the assigned code amount for the second coding blocks to the calculated code amounts of the second coding blocks in the case where the first total is not lower than the second total; and
determines the assigned code amount for the second coding blocks in accordance with a ratio between the first total and the second total in the case where the first total is lower than the second total.

3. The image processing apparatus according to claim 2, wherein in the case where the first total is lower than the second total, the determination unit determines the assigned code amount of the second coding blocks by adding the difference between each of the calculated code amount of the second coding blocks and the reference code amount to the reference code amount on the basis of the ratio between the first total and the second total.

4. The image processing apparatus according to claim 1, wherein for each of pixels included in the coding block, the code amount calculation unit calculates a code amount of a result of quantization of a predictive difference, according to a predetermined quantizing step, and variable-length coding on the quantized difference, wherein the predictive difference being a difference between the pixel value of the pixel and a predictive value of another pixel.

5. The image processing apparatus according to claim 4, wherein the predetermined quantizing step is a minimum quantizing step.

6. The image processing apparatus according to claim 1, wherein the coding unit carries out the coding having selected a coding method and quantization parameters so that the coded data has a data amount not exceeding the assigned code amount assigned to the corresponding coding block.

7. The image processing apparatus according to claim 6, wherein the coding unit selects, as the coding method, a first coding method that outputs a quantized image, or a second coding method that outputs data obtained by coding a difference between the quantized image and a predictive image.

8. The image processing apparatus according to claim 6, wherein the coded data includes a header having a size based on the selected coding method.

9. An image processing method comprising:
calculating a code amount obtained upon coding a coding block, the coding block being obtained by dividing an image to be processed;
on the basis of a reference code amount, and the code amount calculated in the calculating for each of coding blocks in a coding group including a plurality of coding blocks, determining an assigned code amount to be assigned to each of the coding blocks; and
generating coded data by coding each of the coding blocks using the assigned code amount as a target code amount,
wherein in the determining, the assigned code amount is determined so that a total of the assigned code amounts of the coding blocks in the coding group is the same among a plurality of coding groups,
wherein in the generating coded data, fixed-length coding is carried out on a coding group-by-coding group basis by coding using the determine assigned code amounts,
wherein the determining calculates a difference between the calculated code amount and the reference code amount, and determines the assigned code amount on the basis of the difference,
wherein for first coding blocks, among the plurality of coding blocks included in the coding group, in which the calculated code amount is less than or equal to the reference code amount, the determining determines the assigned code amount to be equal to the calculated code amount, and wherein for second coding blocks, among the plurality of coding blocks included in the coding group, in which the calculated code amount is greater than the reference code amount, the determining determines the assigned code amount by distributing, throughout the second coding blocks, a total of a difference between each of the calculated code amounts of the first coding blocks and the reference code amount.

10. A non-transitory computer-readable storage medium storing one or more programs including instructions that, when executed by a processor of an image processing apparatus, causes the processor to perform the operations of:

calculating a code amount obtained upon coding a coding block, the coding block being obtained by dividing an image to be processed;

on the basis of a reference code amount, and the code amount calculated in the calculating for each of coding blocks in a coding group including a plurality of coding blocks, determining an assigned code amount to be assigned to each of the coding blocks; and generating coded data by coding each of the coding blocks using the assigned code amount as a target code amount, wherein in the determining, the assigned code amount is determined so that a total of the assigned code amounts of the coding blocks in the coding group is the same among a plurality of coding groups, wherein in the generating coded data, fixed-length coding is carried out on a coding group-by-coding group basis by coding using the determined assigned code amounts, wherein the determining calculates a difference between the calculated code amount and the reference code amount, and determines the assigned code amount on the basis of the difference, wherein for first coding blocks, among the plurality of coding blocks included in the coding group, in which the calculated code amount is less than or equal to the reference code amount, the determining determines the assigned code amount to be equal to the calculated code amount, and wherein for second coding blocks, among the plurality of coding blocks included in the coding group, in which the calculated code amount is greater than the reference code amount, the determining determines the assigned code amount by distributing, throughout the second coding blocks, a total of a difference between each of the calculated code amounts of the first coding blocks and the reference code amount.

* * * * *